United States Patent [19]

Gross et al.

[11] 3,831,192

[45] Aug. 20, 1974

[54] FREQUENCY DEVIATION COMPENSATION SYSTEM

[75] Inventors: T. A. O. Gross, Lincoln; John W. Ericson, Marblehead, both of Mass.

[73] Assignee: Polaroid Corporation, Cambridge, Mass.

[22] Filed: Oct. 2, 1972

[21] Appl. No.: 294,485

[52] U.S. Cl. .......................... 360/27, 360/8, 360/26, 360/65

[51] Int. Cl. ...... G11b 5/44, G11b 27/22, G11b 5/04

[58] Field of Search ........... 179/100.2 K, 100.2 MD; 178/6.6 A; 340/174.1 B; 360/27, 26, 8, 65

[56] References Cited

UNITED STATES PATENTS

| | | | |
|---|---|---|---|
| 3,017,616 | 1/1962 | Runyan | 340/174.1 B |
| 3,158,845 | 11/1964 | Bengston | 179/100.2 K |
| 3,445,832 | 5/1969 | Leeke et al. | 340/174.1 B |
| 3,614,305 | 10/1971 | Hidaka et al. | 179/100.2 K |
| 3,643,013 | 2/1972 | Lemoine | 179/100.2 K |

*Primary Examiner*—Alfred H. Eddleman
*Attorney, Agent, or Firm*—John W. Ericson

[57] ABSTRACT

Apparatus for reducing frequency shifts in a frequency modulated carrier, comprising apparatus for reproducing from a record a recorded reference signal and a recorded information signal, a bi-directional accumulator, apparatus for adding pulses to the accumulator at a rate proportional to the frequency of the reproduced information signal, apparatus for subtracting pulses from the accumulator at a rate proportional to the reproduced reference frequency, apparatus for adding pulses to the accumulator at a reference rate equal to the rate at which the reproduced reference pulses would be subtracted in the absence of frequency deviation, and means for deriving an output signal from overflow signals produced by the accumulator.

11 Claims, 5 Drawing Figures

FREQUENCY DEVIATION COMPENSATION SYSTEM

This invention relates to the recording and reproduction of analog signals, and particularly to a novel frequency deviation compensator for reducing the frequency deviations encountered in the reproduction of recorded analog signals.

When information signals are recorded by sweeping a transducer over a record, and then reproduced by sweeping the same or another transducer over the record, frequency shifts termed "wow" and "flutter" are commonly encountered. These occur because it is quite difficult to keep the instantaneous speed of the recording transducer relative to the record equal to the instantaneous speed of the reproducing transducer relative to the record at corresponding times.

Such frequency deviations are more or less tolerable depending on the kind of signals to be recorded and reproduced and the uses to which they are put. For example, the reproduction of sound can be accompanied by a fair amount of wow and flutter without noticeable distortion, although great paints are taken in the design of quality disk and tape recorders to reduce these effects where high fidelity is desired. A particularly difficult problem is the reproduction of recorded signals frequency modulated in the band where wow and flutter are most commonly encountered; i.e., in the range from zero to a few hundred cycles per second. A carrier signal of, say, from 1 KHz to 10 KHz, frequency modulated with such a signal, is a very desirable vehicle for the communication of many kinds of analog information and, in particular, for the storage and transmission of signals representing conditions which tend to vary rather slowly. Such information is difficult to record and reproduce with amplitude modulated carriers, because of the difficulty of maintaining precise levels, and because of the relatively common occurrence of signal dropouts caused by defects in such common recording media as magnetic tapes and disks. The primary object of this invention is to facilitate the recording and reproduction of relatively narrow band frequency modulated signals in which the modulation occurs in the range that is most commonly affected by wow and flutter.

One approach to the compensation of recorded frequency modulated signals for wow and flutter is disclosed in copending U.S. Application for Letters Patent Ser. No. 294,318, filed on Oct. 2, 1972 at the same time as this application by Thomas A. O. Gross for Methods and Apparatus for Compensating Signals for Frequency Deviation, and assigned to the assignee of this application. In that application, there are disclosed methods and apparatus for compensating a recorded signal that has been recorded simultaneously with a fixed frequency pilot signal.

The signals reproduced from such a recording are separated into the reproduced pilot signal and the information signal, both shifted in frequency in the same way by the effects of wow and flutter. One of the reproduced signals, for example, the reproduced pilot signal, is modulated with a signal from a local oscillator at a fixed frequency to produce a side band in which the frequency of the reference signal is shifted by flutter in an opposite sense from the shift in the reproduced information signal. Cross modulation between this derived signal and the reproduced information signal, together with subsequent modulation and intermediate band pass filtering, produces an output signal in which the center frequency of the information carrier is restored to its initial recorded value, with only a residual deviation in the information signal component, so that for most practical purposes the reproduced signal may be used in the same way as the original signal. A particular object of the invention is to simplify the apparatus disclosed in that application, while retaining the same degree of compensation and making the requirements on the choice of information carrying frequencies and pilot frequencies somewhat less restricted.

The above and other objects of the invention are attained by a novel frequency deviation compensator adapted for use with recorded information signals that have been frequency modulated by a relatively small percentage of the carrier frequency; i.e., about 10 to 20 percent or less, for most practical purposes, and which have been recorded simultaneously with a fixed frequency pilot signal. The recorded information and pilot signals are separated by band pass filters, and multiplied by factors which preferably bring them well above the original recorded values. The two signals thus provided are then limited, to discard essentially all of their informational content except their zero crossings. Pulses corresponding to the zero crossings in the reproduced information signal are used to step an accumulator. The reproduced pilot signal is compared with a local oscillator, to produce a first or a second stream of pulses, depending on whether the pilot signal is at a lower or higher frequency than it would be if undeviated, and these pulse streams are applied to step the accumulator in opposite senses, so that pulses are added or subtracted from the pulses produced in response to the information signal in dependence on the frequency deviations detected in the pilot signal. Overflow pulses from the accumulator are supplied to a low pass filter, which thus produces an alternating signal at the compensated information signal frequency for application to any desired utilization device.

The apparatus of the invention, and its mode of construction and operation, will best be understood in the light of the following detailed description, together with the accompanying drawings, of various illustrative embodiments thereof.

Figure 1:
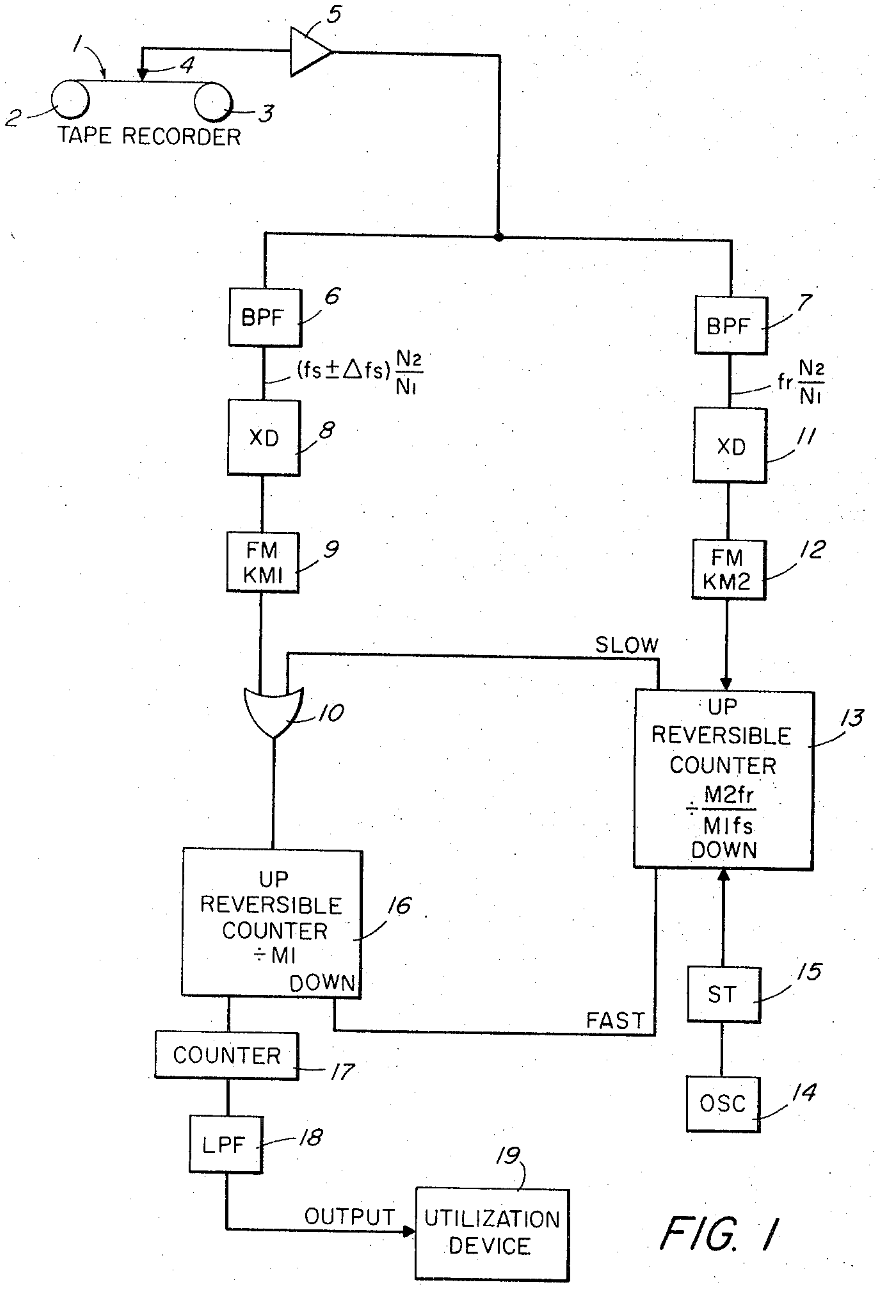
FIG. 1 is a schematic block and wiring diagram of a frequency compensating system in accordance with the invention.

Referring to FIG. 1, there is schematically shown a tape recorded comprising a reel of tape 1 disposed for transport between a supply reel 2 and a takeup reel 3 for movement relative to a playback head 4. On the tape 1 are assumed to be recorded a frequency modulated signal, such as a carrier at 2,200 Hz modulated by an information component in the range of ±140 Hz. Recorded simultaneous with the information signal, and for example on the same track, is a reference pilot signal at a constant frequency of, for example, 3,080 Hz.

Signals reproduced by the head 4 are supplied to a conventional amplifier 5. The output signals from the amplifier 5 are applied to two band pass filters 6 and 7. The filter 6 may be designed to pass the carrier frequency fs of 2,200 Hz, with a pass band sufficient to accommodate the modulation on the carrier and the frequency shifts that may be experienced because of differences between the instantaneous recording and playback speeds. As an example of the kind of speed deviations that may be encountered, a one percent deviation is considered to be very poor performance for a tape recorder, and that may be taken as a typical worst case, although deviations of as much as two percent may occasionally be encountered with poor equipment in the presence of dust and dirt.

The band pass filter 7 is arranged to pass the reference frequency $fr$, for example, at 3,080 Hz, with a pass band on either side wide enough to accommodate the expected frequency shifts. If the tape 1 was initially recorded at a relative speed N1 between the recording head and the tape, and reproduced at the relative speed N2 of the playback head 4 relative to the tape 1, the output of the band pass filter 6 may be expressed as $N2(fs \pm \Delta fs)/N1$. Similarly, the output from the band pass filter 7 may be expressed as $N2fr/N1$.

The output signal from the filter 6 is applied to any conventional zero crossing detector 8 which produces an output pulse at each zero crossing of the applied signal. The squared signal thus produced is applied to any conventional frequency multiplier 9, which serves to multiply the repetition rate of the applied pulses by a factor KM1. The individual factors K and M1 are numbers selected in a manner that will be apparent from the following description, and the total multiple KM1 is selected to be sufficient to make the output pulse repetition rate many times the input frequency. The frequency multiplier 9 may be a harmonic generator and selector, followed by a Schmitt trigger or the like, a servo-controlled variable frequency oscillator, or a pulse multiplier. A suitable pulse multiplier will be described below in connection with FIG. 4.

The output signal from the frequency multiplier 9 is a train of pulses at a rate that is a chosen multiple of the rate at which zero crossings occur in the reproduced information signal. This pulse train is applied to one input terminal of a conventional OR gate 10. The OR gate 10 thus produces an output pulse each time a pulse is supplied by the frequency multiplier 9.

The output signals from the band pass filter 7 are supplied to a conventional zero crossing detector 11, which produces an output pulse at each zero crossing in the reproduced reference signal. These pulses are supplied to a frequency multiplier 12, where the pulses are multiplied by a factor KM2, K and M2 being numbers selected in a manner to be described.

Output pulses from the multiplier 12 are supplied to the UP terminal of reversible counter 13, and thus step the counter 13 by one counter state for each pulse so applied. The counter 13 may be arranged to divide the input pulse stream by the factor $M2fr/M1fs$, where $fr$ and $fs$ are the recorded pilot and information carrier frequencies, and the factors M2 and M1 correspond to those described above.

The counter 13 is arranged to be stepped in the opposite sense by pulses applied to a terminal labeled DOWN. For this purpose, a local oscillator 14 supplies a signal to a Schmitt trigger circuit 15 to produce pulses applied to the DOWN terminal at a rate that would equal the pulses applied to the UP terminal by the multiplier 12 if there were no frequency deviations in the reproduced carrier signal.

When the counter 13 overflows because more DOWN pulses are applied than UP pulses, for an interval sufficient to cause the counter to recycle, a pulse is produced on a lead labeled SLOW. The SLOW pulses are applied to a second input terminal of the OR gate 10.

When the pulses from the multiplier 12 occur more rapidly than the pulses from the Schmitt trigger 15, overflow of the counter causes pulses labeled FAST to be applied to the DOWN terminal of a second reversible counter 16. The counter 13 and 16 may be conventional reversible binary counters, one example of which will be described below in connection with FIG. 2.

The counter 16 is arranged to divide an input pulse stream by a factor M1. The pulses stepping the counter in the UP direction are supplied from the output terminal of the OR gate 10.

Overflow pulses from the counter 16 in the UP direction are supplied to a binary counter 17 which is a conventional unidirectional cyclic binary counter arranged to divide by the factor K. Overflow pulses from the counter 17 are applied to a low pass filter 18, which forms an alternating output signal, compensated in frequency in a manner to be described below. This compensated signal is supplied to any desired utilization device, shown in block form at 19. The utilization device 19 may be a chart recorder, or the like, or, for example, it might be a servomotor in a simulator that was using the recorded signals as a source of simulated data.

Figure 2:
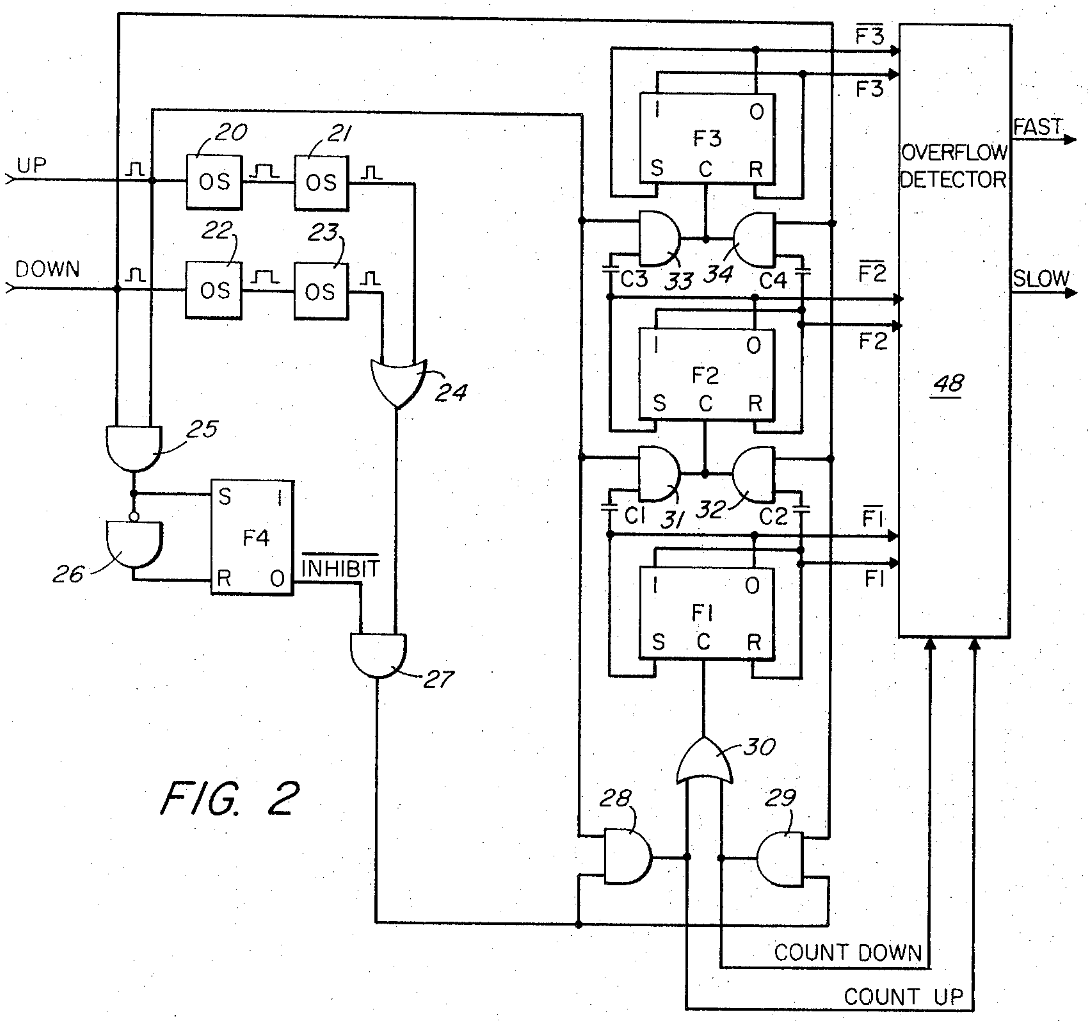
FIG. 2 is a schematic block and wiring diagram of a reversible counter forming a part of the apparatus of FIG. 1.

FIG. 2 shows a suitable circuit for the reversible counter 13. The input signals labeled UP in FIG. 2 are those applied to the UP terminal of the counter 13 in FIG. 1, and the pulses labeled DOWN are those applied to the DOWN output terminal.

The UP pulses are applied to the trigger input terminal of a conventional one-shot multivibrator 20, which produces an output pulse at the leading edge of each applied UP pulse. At the trailing edge of each pulse produced by the multivibrator 20, a second one-shot multivibrator 21 is triggered to produce an output pulse. The output pulse from the multivibrator 21 is arranged to be of shorter duration than, and to occur approximately in the middle of, each UP pulse.

Similarly, the DOWN pulses are supplied to the input terminal of a one-shot multivibrator 22. The multivibrator 22 is triggered at the leading edge of each DOWN pulse to produce an output pulse. The trailing edge of this pulse triggers a one-shot multivibrator 23 to produce a pulse that is short with respect to the DOWN pulse, and which occurs in approximately the middle of the DOWN pulse.

The pulses produced by the multivibrators 21 and 23 are supplied to a conventional OR gate 24, which thus produces an output pulse each time either the multivibrator 21 or the multivibrator 23 is triggered. The pulses from the output terminal of the gate 24 are connected to one input terminal of a conventional AND gate 27.

The UP and DOWN pulses are also applied to two input terminals of a conventional AND gate 25. The gate 25 thus produces a logic 1 output signal when and only when both an UP pulse and a DOWN pulse are present at the same time. This gate 25 serves as a coincidence detector to set a conventional flip-flop F4 each time there is a coincidence between UP and DOWN pulses.

The output terminal of the gate 25 is also applied to the input terminal of a conventional NOR gate 26, used as an inverter. The output terminal of the gate 26 is connected to reset the flip-flop F4 when the output signal from the gate 25 is at logic zero.

A signal labeled $\overline{\text{INHIBIT}}$ is produced at the logic zero output terminal of the flip-flop F4. This signal is present at logic 1 when the flip-flop F4 is reset, and disappears when it is set. Thus, when one of the multivibrators 21 and 23 produces an output pulse and the level $\overline{\text{INHIBIT}}$ is present, the gate 27 produces an output pulse. This pulse is applied to step a reversible counter comprising three conventional synchronous flip-flops F1, F2, and F3, in one sense or another in dependence on whether an UP pulse or a DOWN pulse is currently present.

For this purpose, the output terminal of the gate 27 is connected to one input terminal of each of two conventional AND gates 28 and 29. A second input terminal of the gate 28 receives the UP pulses, and a second input terminal of the gate 29 receives the DOWN pulses. The purpose of the $\overline{\text{INHIBIT}}$ signal produced by the flip-flop F4 is to prevent the counter from being directed to step in different directions at times too close to the same time, with a possible transient disturbance in the contents of the counter.

The output terminals of the gates 28 and 29 are connected through an OR gate 30 to the clock pulse input terminal of the flip-flop F1. This flip-flop, and other similar flip-flops to be described, may be of the conventional variety that is adapted to be set by a clock pulse transition applied to its terminal C when a logic 1 signal has been present at an input terminal S for a brief interval, and to be reset when the clock pulse transition is applied to the terminal C and a logic 1 level has been present at the reset input terminal R for the same interval.

The flip-flop F1 is connected as a counter stage by connecting its logic 1 output terminal to its reset terminal R, and connecting its logic zero terminal to its set terminal S. Thus, if the flip-flop is current set, it will be enabled to be reset at the next clock pulse, and vice versa. The flip-flops F2 and F3 are similarly connected, in a manner that will be sufficiently apparent from the drawing and the above description.

In order to enable the counter to count up, each time a lower ordered stage goes through a transition from set to reset, the next higher ordered stage should be changed in state. For this purpose, the logic zero output terminal of the flip-flop F1 is connected through a capacitor C1 to one input terminal of a conventional AND gate 31. A second input terminal of gate 31 receives the UP pulses. Thus, when an UP pulse is present, and a count signal occurs that causes the flip-flop F1 to go from its set to its reset state, a positive signal will be coupled through the capacitor C1 to the gate 31, causing it to produce an output transition that will be applied to the clock terminal C of the flip-flop F2 and cause it to change state.

Similarly, when it is desired to count down, it is necessary that each transition of a lower ordered stage from zero to one should cause the next higher ordered stage to change state. For that purpose, the logic 1 output terminal of the flip-flop F1 is connected through a capacitor C2 to one input terminal of a conventional AND gate 32. A second input terminal of the gate 32 receives the DOWN pulses. Thus, when a DOWN pulse is produced and the flip-flop F1 is set, the transition produced at its logic 1 output terminal will cause the gate 32 to trigger the flip-flop F2 and cause it to change state.

The flip-flop F2 is similarly connected to the flip-flop F3. Specifically, the logic zero output terminal of the flip-flop F2 is connected through a capacitor C3 to one input terminal of an AND gate 33, the second input terminal of which receives the UP pulses. The logic 1 output terminal of the flip-flop F2 is connected to an AND gate 34 through a capacitor C4. The second input terminal of the gate 34 receives the DOWN pulses. The output terminals of the gates 33 and 34 are connected together and to the clock input terminal C of the flip-flop F3. The flip-flop F3 is simply wired as a one-stage binary counter, with its logic 1 output terminal connected to its reset input terminal R, and its logic zero output terminal connected to its set input terminal S.

The stages of the counter are represented by the signals F3 and $\overline{\text{F3}}$, appearing at the logic 1 and logic zero output terminals of the flip-flop F3, and by the correspondingly lower ordered signals F2 and $\overline{\text{F2}}$, and F1 and $\overline{\text{F1}}$, appearing at the corresponding terminals of the lower ordered stages of the counter. These terminals are connected to an overflow detector 48, which produces a FAST pulse each time the counter overflows in the UP direction, and a SLOW pulse each time the counter overflows in the DOWN direction.

The overflow detector 48 also receives signals labeled COUNT UP and COUNT DOWN, which occur at the output terminals of the AND gates 28 and 29, respectively. One suitable form of overflow detector will be described below in connection with FIG. 3.

The manner in which counting is accomplished in the apparatus of FIG. 2 will next be described with reference to the following table, in which the states of the various flip-flops are represented as 1 when set and 0 when reset. Operation is illustrated by the application of 9 UP pulses, and 8 DOWN pulses, to the counter, represented in the table by 1's which occur when the pulses occur between the illustrated states of the counter.

| F3 | F2 | F1 | UP | DOWN |
|---|---|---|---|---|
| 0 | 0 | 0 | | |
| | | | 1 | |
| 0 | 0 | 1 | | |
| | | | 1 | |
| 0 | 1 | 0 | | |
| | | | 1 | |
| 0 | 1 | 1 | | |
| | | | 1 | |
| 1 | 0 | 0 | | |
| | | | 1 | |
| 1 | 0 | 1 | | |
| | | | 1 | |
| 1 | 1 | 0 | | |
| | | | 1 | |
| 1 | 1 | 1 | | |
| | | | 1 | |

-Continued

| F3 | F2 | F1 | UP | DOWN |
|---|---|---|---|---|
| 0 | 0 | 0 | | |
| | | | 1 | |
| 0 | 0 | 1 | | |
| | | | | 1 |
| 0 | 0 | 0 | | |
| | | | | 1 |
| 1 | 1 | 1 | | |
| | | | | 1 |
| 1 | 1 | 0 | | |
| | | | | 1 |
| 1 | 0 | 1 | | |
| | | | | 1 |
| 1 | 0 | 0 | | |
| | | | | 1 |
| 0 | 1 | 1 | | |
| | | | | 1 |
| 0 | 1 | 0 | | |
| | | | | 1 |
| 0 | 0 | 1 | | |

As an example, if all of the flip-flps are reset and an UP pulse appears, the flip-flop F1 will be set through the gates 28 and 30. No transition will occur in the higher ordered stages, because the gates 32 and 34 are disabled and the gate 31 does not receive a transition in the appropriate sense. Similarly, if all flip-flops are reset and a DOWN pulse is produced, the flip-flop F1 will be set through the gates 29 and 30, causing a transition at the logic 1 output terminal that will set the flip-flop F2 through the capacitor C2 and the gate 32, enabled by the presence of the DOWN pulse. Setting of the flip-flop F2 will set the flip-flop F3 through the capacitor C4 and the gate 34.

It will be apparent that a counter constructed along the lines shown in FIg. 2 can divide by 2, 4, 8, or any other power of 2. It will also be clear to those skilled in the art that the stages of the counter could be gated in other ways to divide by a factor such as 3, 5, 6, 7, and so on, if desired. For division by 8, the overflow detector 48 could detect a COUNT UP pulse that occurred when the counter was at 111 as an UP overflow state, producing a FAST signal pulse. Similarly, a COUNT DOWN pulse occurring when the counter was in the state 000 could be detected as a DOWN overflow pulse, producing an output SLOW pulse.

Even more flexible use of the counter, to cause it to divide by a rational fraction, can be accomplished, as will be illustrated in connection with the particular overflow detector shown in FIG. 3. This detector produces three overflow FAST pulses for each up cycle of the counter, and three overflow SLOW pulses for each down cycle of the counter.

For this purpose, the signals $\overline{F1}$ and F3 are applied to two input terminals of a conventional AND gate 35 that has its output terminal connected to one input terminal of an OR gate 37. The signals F1, $\overline{F2}$ and $\overline{F3}$ are applied to an AND gate 36 that has its output terminal connected to the second input terminal of the gate 37. When the gate 37 produces a logic 1 output signal, an enabling logic 1 level is applied to the set input terminal of a conventional synchronous flip-flop F5. When this level is present and a COUNT UP pulse is encountered, which pulse is applied to its input clock terminal C, the flip-flop F5 will be set to trigger a multivibrator 39 and thereby produce a FAST pulse. That will occur each time a COUNT UP pulse is received and the flip-flops F1, F2, and F3 are in any of the states 001, 100, and 110.

The output terminal of the gate 37 is connected to the input terminal of a conventional NOR gate 38 that serves as an inverter. The output terminal of the gate 38 is connected to a direct reset terminal of the flip-flop F5, to reset it each time the output terminal of the gate 37 goes to logic zero. The direct reset input terminal will reset the flip-flop F5 without the presence of a clock pulse.

Similarly, a conventional flip-flop F6 responds to a COUNT DOWN pulse supplied to its clock input terminal C by setting the flip-flop F6 to trigger a multivibrator 44 to produce a SLOW pulse each time a COUNT DOWN pulse is encountered and the flip-flop F1, F2, and F3 are in any of the states 010, 101, or 111. For this purpose, the signals F1 and F3 are applied to the input terminals of an AND gate 40 that has its output terminal connected to one input terminal of an OR gate 42. The signals $\overline{F1}$, F2, and $\overline{F3}$ are applied to the input terminals of an AND gate 41 that has its output terminal connected to a second input terminal of the gate 42.

The output terminal of the gate 42 is connected to the set input terminal S of the flip-flop F6. The output terminal of the gate 42 is also connected to the direct reset input terminal DR of the flip-flop F6 through a NOR gate 43 that serves as an inverter for the purposes described above.

Figure 3:
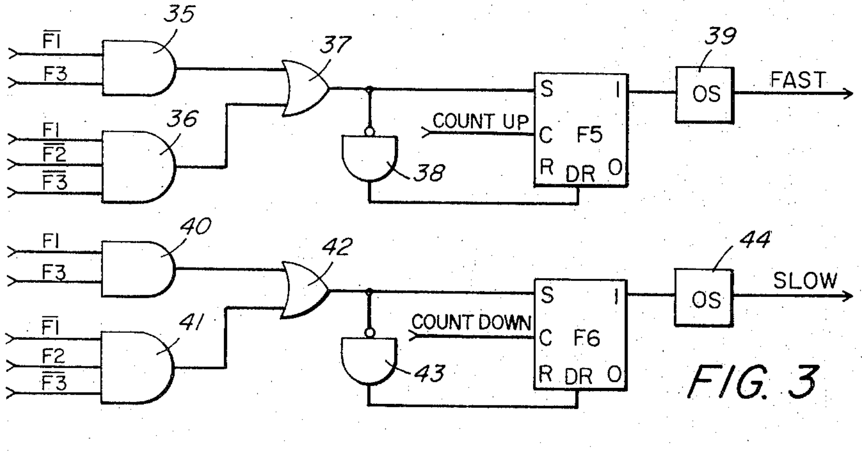
FIG. 3 is a schematic block and wiring diagram of one form of overflow detector usuable in the counter of FIG. 2.

It will be apparent that the principles illustrated by the overflow detector of FIG. 3 could be applied to the detection of any integral or fractional ratio within the capability of the number of counter stages provided. As a simple example, if it is desired to simply divide by 8 in either direction, the gates 40 and 42 could be omitted and the output terminal of the gate 41 directly connected to the set input terminal of the flip-flop F6 and to the input terminal of the NOR gate 43. The gates 35 and 37 could be omitted and the output terminal of the gate 36 directly connected to the set input terminal of the flip-flop F5 and to the input terminal of the NOR gate 38. For that purpose, with the gate 41 receiving the signals shown, the gate 36 would receive the signals F1, $\overline{F2}$, and $\overline{F3}$. It is thought that the flexibility of the arrangement will be sufficiently apparent from the above description.

Figure 4:
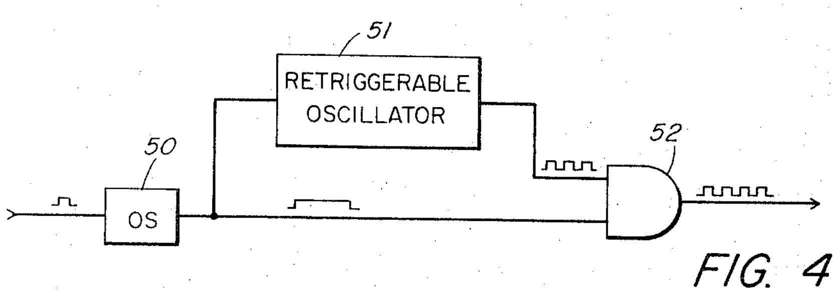
FIG. 4 is a schematic wiring diagram of a pulse multiplier suitable for use in the system of FIG. 1.

FIG. 4 shows a pulse multiplier suitable for use as either of the frequency multipliers 9 or 12 in FIG. 1. As shown, the pulse multiplier comprises a one-shot multivibrator 50 which is triggered at each applied input pulse to produce an output pulse of a predetermined duration. The output pulse from the multivibrator 50 is used to enable an AND gate 52. The leading edge of each pulse from the multivibrator 50 also serves to retrigger a conventional retriggerable oscillator 51 so that it will begin to produce pulses at a fixed rate at the leading edge of each pulse from the multivibrator 50. For example, if it was desired to multiply by 10, the duration of the pulse from the multivibrator 50 could be selected to gate ten pulses from the oscillator 51 to the output of the gate 52.

The output pulse from the multivibrator 50 could be designed to be somewhat less than the shortest interval between information pulses, so that approximate phase stability would be produced. However, the counter 17 in FIG. 1 enables considerable irregularities in the current rates of the pulses that cause the counter 16 to overflow to be smoothed out, so that the signal applied to the filter 18 can be relatively noise-free and have a very strong component proportional to the desired compensated output signal.

For use as the reversible counter 16, a circuit of the type shown in FIG. 2 could be employed, except that only the FAST overflow terminal would be required to step the counter 17.

Operation of the apparatus of FIGS. 1 – 4 will next be considered in the light of an heuristic theoretical explanation of the operation of the system. With reference to FIG. 1, it is assumed that the information signal and the pilot signal were recorded at a speed N1 and at frequencies $fs \pm \Delta fs$ and $fr$, respectively, and that the frequency of the oscillator 14 is $KM2fr$. The instantaneous playback speed is assumed to be N2. The zero crossing detectors 8 and 11 are each assumed to be of the type which produce an output pulse at each positive-going zero crossing, although it will be obvious that they could detect negative-going zero crossings, or all zero crossings, if so desired. It will be assumed that the frequency multipliers 9 and 12 are pulse multipliers of the type described above.

The number of pulses produced by the zero crossing detector will be $(fs \pm \Delta fs)N2/N2$, and the frequency multiplier 9 will accordingly produce pulses at the rate $KM1N2/N1(fs \pm \Delta fs)$. The frequency multiplier 12 will apply UP pulses to the counter 13 at the rate $KM2N2fr/N1$. The Schmitt trigger 15 will apply DOWN pulses to the counter 13 at the rate $KM2fr$.

If the pulses from the multiplier 12 occur more rapidly than those from the Schmitt trigger 15, FAST pulses will be applied to the DOWN terminal of the counter 16 at the rate $KM2fr([N2/N1]-1)M1fs/M2fr = KM1fs([N2/N1]-1)$. The counter 16 will thus produce overflow pulses at the rate $KM1N2/N1M1(fs \pm \Delta fs) - KM1fs/M1([N2/N1]-1) = Kfs \pm KN2\Delta fs/N1$.

If the pulses from the multiplier 12 occur less frequently than those from the Schmitt trigger 15, SLOW pulses will be applied to the UP terminal of the counter 16, together with the pulses from the multiplier 9, by the OR gate 10. The counter 16 will then produce overflow pulses at the rate $M1fs/M1M2fr\ (KM2fr - [KM2frN2/N1]) + KM1/M1\ N2/N1(fs \pm \Delta fs) = Kfs(1 - [N2/N1]) + KN2/N1(fs \pm \Delta fs) = Kfs \pm (KN2/N1)\Delta fs$, or the same rate at which pulses are produced by the counter 16 when FAST pulses are applied.

The counter 17 will then produce output pulses at the rate $fs \pm (N2/N1)\Delta fs$. These pulses, applied to the low pass filter 18, will produce a compensated output signal at the desired center frequency $fs$, modulated with the shifted signal $\pm (N2/N1)\Delta fs$. The residual fractional error $Ec$ in the compensated signal is thus $Ec = (1 - [N2/N1])$. The error $Eu$ in the uncompensated signal, at the output of the amplifier 5, for example, is $Eu = (1 - [N2/N1])(1 \pm [fs/\Delta fs])$.

The improvement effected by compensating the signal in the manner described can be expressed as a correction factor $Cf$, where $Cf = Eu/Ec = 1 \pm (fs/\Delta fs)$.

The factor $Cf$ thus increases linearly with the carrier frequency $fs$, and is larger at smaller degrees of modulation.

The exemplary embodiment of the invention described above is susceptible to considerable variation within the scope of the invention in its broader aspects. For example, the oscillator 14 and Schmitt trigger 15 could be arranged to produce counting pulses at the rate KM1fs, and these pulses could be applied directly to the OR gate 10 to advance the counter 16. The reversible counter 13 would be replaced by a unidirectional counter dividing by the same factor as the counter 13 to produce overflow pulses in response to pulses from the multiplier 12 at a rate $KM1fs\ (N_2/N_1)$, and these pulses would be applied directly to the DOWN terminal of the reversible counter 16.

Figure 5:
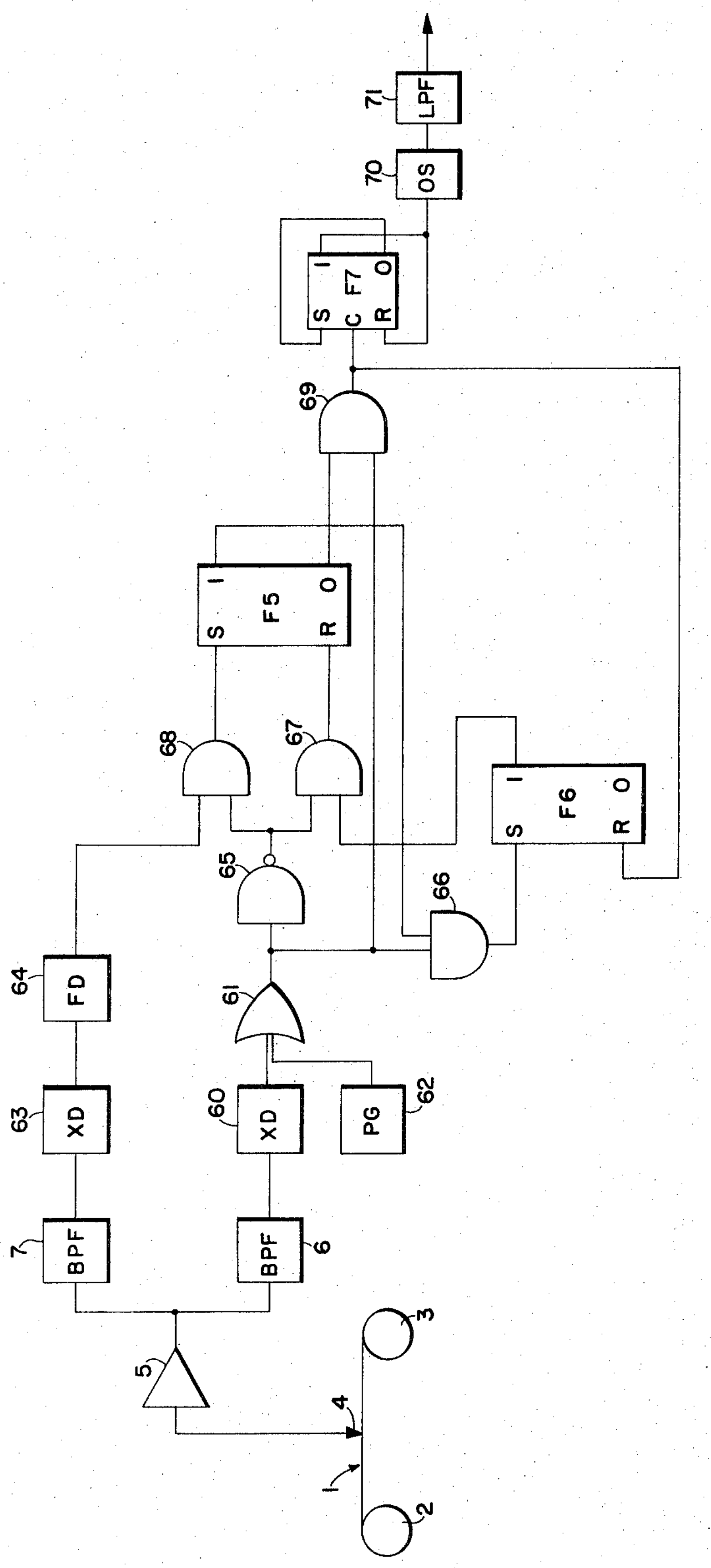
FIG. 5 is a schematic block and wiring diagram of a frequency compensating system in accordance with a modification of the invention.

FIG. 5 shows another embodiment of the invention in which the reversible accumulator is replaced by a pulse inhibiting gate. The information signal at the frequency $fs \pm \Delta fs$ and the reference signal at the frequency $fr$ are simultaneously recorded on the tape 1, and simultaneously reproduced by the transducer 4, as described above.

The reproduced signals are amplified by the amplifier 5, and separated by the band pass filters 6 and 7, as described above. The reproduced information signal from the band pass filter 6, at the frequency $(fs \pm \Delta fs)\ N_2/N_1$ is applied to a zero crossing detector 60, which produces an output pulse at every zero crossing of the input signal, and thus produces output pulses at a rate $2(fs \pm \Delta fs)\ N_2/N_1$. These pulses are applied to one input terminal of an OR gate 61.

A second input terminal of the gate 61 receives a train of pulses from a pulse generator 62. The pulse generator 62 may comprise an oscillator followed by a Schmitt trigger, such as the elements 14 and 15 in FIG. 1, selected to produce pulses at a rate $2fs$. The gate 61 thus produces output pulses at a rate $2fs(1 + [N_2/N_1]) \pm (2N_2/N_1)\Delta fs$.

The reproduced reference signal at the frequency $fr(N_2/N_1)$ is supplied from the filter 7 to a zero crossing detector 63, also of the type which produces an output pulse for every zero crossing of the input signal. These pulses thus occur at a rate $2frN_2/N_1$.

Pulses from the zero crossing detector 63 are applied to a frequency divider 64, of any of the kinds described above, which multiplies the input pulses by a factor $fs/fr$ to produce a train of output pulses at the rate $2fsN_2/N_1$. These pulses each inhibit the transmission of one pulse from the gate 61 in a manner next to be described.

The output terminal of the gate 61 is connected to the input terminal of a NAND gate 65, which serves as an inverter, and to one input terminal of an AND gate 66. A second input terminal of the gate 66 is connected to the logic 1 output terminal of a conventional flip-flop F5.

The output terminal of the gate 66 is connected to the set input terminal S of a conventional flip-flop F6. The logic 1 output terminal of the flip-flop F6 is connected to one input terminal of an AND gate 67.

A second input terminal of the gate 67 is connected to the output terminal of the gate 65. The output terminal of the gate 65 is also connected to one input terminal of an AND gate 68.

A second input terminal of the gate 68 is connected to the output terminal of the frequency divider 64. The output terminal of the gate 68 is connected to the set input terminal S of the flip-flop F5, and the output terminal of the gate 67 is connected to the reset input terminal R of the flip-flop F5.

The logic zero output terminal of the flip-flop F5 is connected to one input terminal of an AND gate 69. A second input terminal of the gate 69 is connected to the output terminal of the gate 61.

The output terminal of the gate 69 is connected to the reset input terminal R of the flip-flop F6, and to the trigger input terminal C of a conventional flip-flop F7 connected as a one-stage binary counter. For that purpose, as described above, the logic 1 output terminal of the flip-flop F7 is connected to its reset input terminal R, and the logic zero output terminal of the flip-flop F7 is connected to its set input terminal S.

The logic 1 output terminal of the flip-flop F7 is connected to a conventional one shot multivibrator 70, which produces an output pulse each time the flip-flop F7 is set; i.e., at every other applied pulse. These pulses are supplied to a low pass filter 71, to produce a compensated alternating output signal at the frequency $fs \pm (N_2/N_1)\Delta fs$. The manner in which the inhibiting gate operates to produce the pulse trains from which this output signal is derived will next be described.

With the flip-flops F5 and F6 reset, and in the absence of pulses from the frequency divider 64, the counter comprising the flip-flop F7 would receive each pulse from the gate 61 through the gate 69, and thus produce output pulses at the rate $fs(1+N_2/N_1]) \pm (N_2/N_1)\Delta fs$. The pulses from the frequency divider 64 are made somewhat longer in duration than the pulses from the gate 61, so that during each pulse from the frequency divider 64, there will be an interval at which the output terminal of the gate 65 is at logic 1 (no pulse at the input terminal of the gate 65), and thus a logic one at both input terminals of the gate 68. The flip-flop F5 will therefore be set by each pulse from the frequency divider 64.

When the flip-flop F5 is set and a pulse is produced by the gate 61, the flip-flop F6 will be set through the gate 66. With the flip-flop F5 set, the gate 69 will be disabled, and no output pulse will be produced. From another point of view, a pulse will be subtracted from the output pulse stream.

When the flip-flop F6 is reset and the pulse produced by the gate 61 is gone, the gate 65 will enable the gate 67 to reset the flip-flop F5. The next pulse produced by the gate 61 will produce an output pulse from the gate 69, stepping the counter comprising the flip-flop F7 and resetting the flip-flop F6.

The counter flip-flop F7 will thus receive pulses at a rate equal to the sum of the rates produced by the zero crossing detector 60 and the pulse generator 62 minus the rate at which the frequency divider 64 produces pulses. The rate of the output pulse train is then given by:

$$fs(1+[N_2/N_1]) \pm (N_2/N_1)\Delta fs - fs(N_2/N_1) = fs \pm (N_2/N_1)\Delta fs$$

While the invention has been described with respect to the details of various illustrative embodiments, many changes and variations will occur to those skilled in the art upon reading this description, and such can obviously be made without departing from the scope of the invention.

Having thus described the invention, what is claimed is:

1. In apparatus for compensating an information signal for frequency deviations with the aid of a reference signal having corresponding frequency deviations from a predetermined frequency, the combination comprising means responsive to the information signal for producing a first train of signals at a first rate determined by the frequency of the information signal, means for producing a second train of signals at a fixed section rate determined by the said predetermined frequency, means responsive to the reference signal for producing a third train of signals at a third rate determined by the frequency of the reference signal, and signal generating means responsive to said first, second and third signal trains for producing an output train of signals at a rate determined by the sum of said first and second rates minus said third rate, said signal generating means comprising a reversible accumulator for counting the signals of said first, second and third trains and producing an output signal each time the number of signals of said first and second trains exceeds the number of signals of said third train by a predetermined number.

2. The apparatus of claim 1, in which said reversible accumulator comprises first reversible counting means responsive to said second and said third train of signals for producing a first error signal each time the number of signals of said second train exceeds the number of signals of said third train by the first predetermined number, and producing a second error signal each time the number of signals of said third train exceeds the number of signals of said second train by said first predetermined number, and second reversible counting means stepped in a first senese by each signal of said first train and by each of said first error signals and stepped in a second sense by each of said second error signals, said second reversible counting means further comprising means for producing an output signal each time said second counting means is stepped in said first sense a second predetermined number of times.

3. In apparatus for reproducing an information signal frequency modulated on a carrier signal about a first frequency and recorded on a record simultaneously with a reference signal at a constant second frequency, the combination comprising, transducer means for simultaneously reproducing said information signal and said reference signal from the record, first reversible counting means responsive to first and second applied counting signals for producing a third counting signal each time said first counting signals exceed said second counting signals by a first predetermined number, and a fourth counting signal each time said second counting signals exceed said first counting signals by said first predetermined number, means responsive to said reproduced information signal for applying first counting signals to said first reversible counting means at a rate determined by the frequency of said reproduced information signal, signal generating means for applying second counting signals to said first reversible counting means at a fixed rated determined by said second frequency, means responsive to said reproduced information signal for producing fifth counting signals at a rate determined by the frequency of said reproduced information signal, and second reversible counting means responsive to said third, fourth and fifth counting signals for producing a sixth counting signal each time the sum of said fourth and fifth counting signals exceed said third counting signals by a second predetermined number.

4. The apparatus of claim 3, further comprising filter means responsive to said sixth counting signals for producing an alternating output signal at said first frequency modulated by said information signal.

5. Apparatus for compensating an information signal for frequency deviations with the aid of a reference signal having corresponding frequency deviations, comprising first pulse producing means for producing a stream of pulses at a first rate proportional to the frequency of said information signal, means responsive to said reference signal for substracting pulses from said stream at a second rate proportional to the frequency of said reference signal, second pulse producing means for adding pulses to said stream at a fixed third rate, and filter means responsive to said pulse stream for producing a compensated output signal at a frequency determined by the difference between the sum of said first and third rates and said second rate.

6. In apparatus for compensating an information signal recorded on a record at a frequency $fs \pm \Delta fs$ simultaneously with a reference signal at a frequency $fr$ by transducer means moving relative to the record at a speed $N_1$, and reproduced from the record simultaneously with said reference signal by transducer means moving relative to the record at a speed $N_2$, whereby said reproduced information signal has a frequency $(fs \pm \Delta fs)N_2/N_1$, and said reproduced reference signal has a frequency $frN_2/N_1$, said apparatus comprising, means responsive to said reproduced information signal for producing a train of first pulses at a rate $KM1\ (fs \pm \Delta fs)\ N_1/N_2$, means resonsive to said reproduced reference signal for producing a train of second pulses at a rate $KM_2\ fr(N_2/N_1)$, means for producing a train of third pulses at a rate $KM2\ fr$, first reversible counting means to said second and third pulses for producing a train of fourth pulses or a train of fifth pulses according as said second pulses exceed said third pulses or said third pulses exceed said second pulses, respectively, by an amount $M2fr/M1fs$, said fourth and fifth pulses, when produced, each occurring at a rate $KM1fs\ (1-[N_2/N_1])$, and second reversible counting means responsive to said first, fourth and fifth pulses for producing a train of sixth pulses at a rate $K(fs \pm [N_2/N_1]\ \Delta fs)$.

7. The apparatus of claim 6, further comprising counting means responsive to said sixth pulses for producing a train of seventh pulses at a rate $fs \pm (N_2/N_1)\Delta fs$, and filter means responsive to said sixth pulses for producing an output signal having a frequency $fs \pm (N_2/N_1)\Delta fs$.

8. Apparatus for reducing frequency shifts in an information signal recorded on a record at a first frequency simultaneously with a reference signal at a constant second frequency, comprising means for simultaneously reproducing the information signal and the reference signal, a bi-directional signal accumulator, means responsive to said reproduced information signal for adding signals to said accumulator at a rate proportional to the frequency of said reproduced information signal, means for subtracting signals from said accumulator at a rate proportional to the frequency of said reproduced reference signal, means for adding signals to said accumulator at a fixed rate equal to the rate at which said means responsive to said reproduced reference signal would subtract signals in the absence of frequency deviations, means controlled by said accumulator for producing overflow signals when the sum of signals added exceeds the sum of signals subtracted by a predetermined amount, and means responsive to said overflow signals for producing a compensated output signal.

9. In apparatus for restoring the center frequency to $fs$ of a frequency modulated information signal at a frequency $N_2/N_1\ (fs \pm \Delta fs)$ with the aid of a reference signal having a frequency $(N_2/N_1)\ fr$, the combination comprising means responsive to the information signal for producing first pulses at a rate equal to a predetermined multiple of the frequency of said information signal, means responsive to said reference signal for producing second pulses at a rate equal to $fs/fr$ times said multiple of the frequency of said reference signal, means for producing third pulses at a rate fs times said multiple, and inhibiting gate means for producing fourth pulses at a rate equal to the rates of said first and third pulses minus said second pulses.

10. The apparatus of claim 9, further comprising means responsive to said fourth pulses for producing fifth pulses at the rate of one for each of said multiple of said fourth pulses.

11. The apparatus of claim 10, further comprising filter means responsive to said fifth pulses for producing an alternating output signal at the frequency $fs \pm (N_2/N_1)\Delta fs$.

* * * * *